US010087042B2

(12) United States Patent
Hatta et al.

(10) Patent No.: US 10,087,042 B2
(45) Date of Patent: Oct. 2, 2018

(54) TANK MANUFACTURING METHOD, HELICAL WINDING DEVICE, AND FILAMENT WINDING APPARATUS

(71) Applicants: TOYOTA JIDOSHA KABUSHIKI KAISHA, Toyota-shi, Aichi-ken (JP); Murata Machinery, Ltd., Kyoto-shi, Kyoto (JP)

(72) Inventors: Ken Hatta, Okazaki (JP); Motohiro Tanigawa, Kyoto (JP); Daigoro Nakamura, Kyoto (JP)

(73) Assignees: Toyota Jidosha Kabushiki Kaisha, Toyota-shi, Aichi-ken (JP); Murata Machinery, Ltd., Kyoto-shi, Kyoto (JP)

( * ) Notice: Subject to any disclaimer, the term of this patent is extended or adjusted under 35 U.S.C. 154(b) by 575 days.

(21) Appl. No.: 14/699,191

(22) Filed: Apr. 29, 2015

(65) Prior Publication Data
US 2015/0329315 A1    Nov. 19, 2015

(30) Foreign Application Priority Data

May 14, 2014    (JP) ................................ 2014-100264

(51) Int. Cl.
*B65H 81/00*    (2006.01)
*B29C 53/66*    (2006.01)

(52) U.S. Cl.
CPC .............. *B65H 81/00* (2013.01); *B29C 53/66* (2013.01)

(58) Field of Classification Search
CPC ..... B29C 53/58; B29C 53/582; B29C 53/583; B29C 53/60; B29C 53/602; B29C 53/64;
(Continued)

(56) References Cited

U.S. PATENT DOCUMENTS 9,688,508 B2 *   6/2017   Tanigawa ............... B65H 81/02
2008/0197229 A1 *  8/2008   Uozumi .................. B29C 53/66
                                                            242/478.2
(Continued)

FOREIGN PATENT DOCUMENTS

EP          2 080 385 A2       5/2009
EP          2060384 A1 *       5/2009     ........... B29C 53/602
(Continued)

*Primary Examiner* — Emmanuel M Marcelo
(74) *Attorney, Agent, or Firm* — Finnegan, Henderson, Farabow, Garrett & Dunner, LLP

(57) ABSTRACT

In a tank manufacturing method using a helical winding device that winds fiber bundles around a mandrel, the device includes: a first guide ring having an opening to pass the mandrel therethrough and placed around the mandrel with an axial center of the mandrel being taken as a center; and a plurality of first guide portions placed in the first guide ring along a circumferential direction around the axial center and configured to supply first fiber bundles to the mandrel. The method includes: moving the mandrel relative to the first guide ring along an axial center direction along the axial center such that the mandrel passes through the opening; and winding the fiber bundles around the mandrel while relatively moving the mandrel in the moving, by the first guide portions supplying the first fiber bundles to the mandrel with the first guide portions swinging in the circumferential direction.

10 Claims, 10 Drawing Sheets

(58) Field of Classification Search
CPC ........... B29C 53/66; B29C 53/70; B21F 3/04;
B65H 81/04; B65H 81/08
See application file for complete search history.

(56) References Cited

U.S. PATENT DOCUMENTS

| | | | |
|---|---|---|---|
| 2009/0038759 A1* | 2/2009 | Uozumi | ................ B29C 53/602 |
| | | | 156/425 |
| 2009/0126875 A1 | 5/2009 | Uozumi et al. | |
| 2009/0314418 A1* | 12/2009 | Uozumi | .................. B29C 53/64 |
| | | | 156/172 |
| 2010/0032510 A1* | 2/2010 | Tanigawa | .............. B29C 53/602 |
| | | | 242/430 |
| 2012/0227864 A1 | 9/2012 | Mori | |
| 2012/0315569 A1* | 12/2012 | Tanigawa | .............. B29C 53/602 |
| | | | 429/515 |

FOREIGN PATENT DOCUMENTS

| | | | | |
|---|---|---|---|---|
| EP | 2060385 A2 * | 5/2009 | ............. | B29C 53/64 |
| JP | 8-291898 | 11/1996 | | |
| JP | 2005-127430 | 5/2005 | | |
| JP | 2009-119803 | 6/2009 | | |
| JP | 2010-5831 | 1/2010 | | |
| JP | 2011-106583 | 6/2011 | | |
| JP | 2011-226558 | 11/2011 | | |

* cited by examiner

F I G . 3
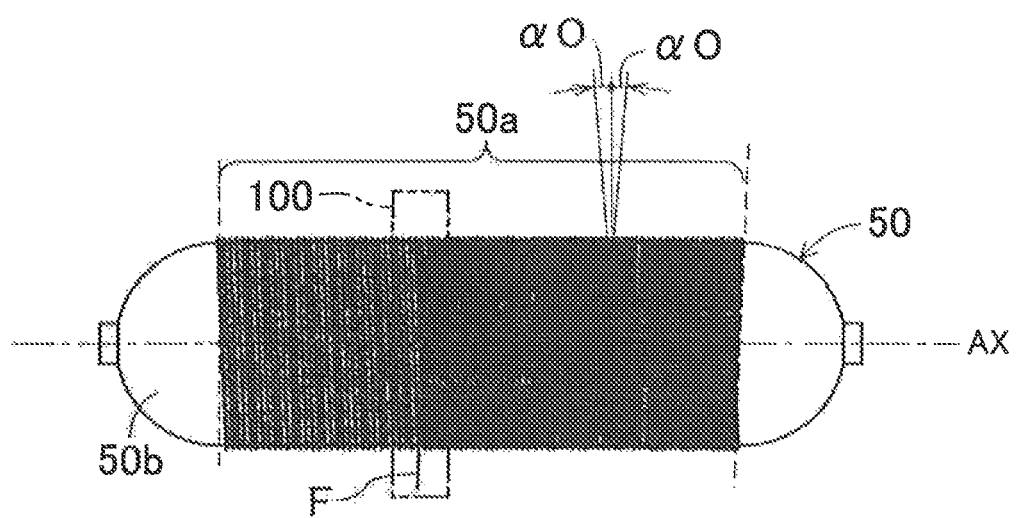

TANK MANUFACTURING METHOD, HELICAL WINDING DEVICE, AND FILAMENT WINDING APPARATUS

INCORPORATION BY REFERENCE

The disclosure of Japanese Patent Application No. 2014-100264 filed on May 14, 2014 including the specification, drawings and abstract is incorporated herein by reference in its entirety.

BACKGROUND OF THE INVENTION

1. Field of the Invention

The present invention relates to a technique to wind fiber bundles around a mandrel.

2. Description of Related Art

There has been known a so-called large-supply helical winding device that supplies fiber bundles to a mandrel from a plurality of guide portions (for example, Japanese Patent Application Publication No. 2009-119803 (JP 2009-119803 A)). The helical winding device described in JP 2009-119803 A includes: a group of guide tubes placed at even intervals along a circumferential direction of a guide ring; and a phase switching structure that changes a circumferential position of the group of guide tubes between a first position (a position in a first state) and a second position (a position in a second state).

When the fiber bundles are supplied to the mandrel from the guide tubes, the fiber bundles are wound around the mandrel by helical winding. The wound fiber bundles thus form a reinforcing layer around the mandrel, and hereby, a tank such as a pressure container is manufactured.

In the technique described in JP 2009-119803 A, at the time when the fiber bundles are wound around the mandrel by the helical winding, a gap might be caused between the fiber bundles wound around the mandrel in an in-plane direction of the reinforcing member. Particularly, a gap might be caused between the fiber bundles in that straight portion of the mandrel which has a constant diameter. Herein, the "gap between the fiber bundles" indicates a gap in the in-plane direction (a direction along a surface of the mandrel) of the reinforcing member formed by winding the fiber bundles.

When the gap is caused between the fiber bundles thus wound around the mandrel, such a possibility occurs that strength of a manufactured tank cannot be improved sufficiently. Further, in a case of using fiber bundles having a broadened width to reduce the occurrence of the gap between the fiber bundles, large guide tubes are required to supply the fiber bundles. Therefore, in order to prevent interference between adjacent guide tubes, an interval between the adjacent guide tubes may be enlarged, which limits placement positions of the guide tubes. In a case where fiber bundles having a width broadened by use of the guide tubes of which the placement positions are limited are wound around the mandrel, a gap may be caused between the fiber bundles having a broadened width.

In view of this, a technique to reduce occurrence of a gap between fiber bundles wound around a mandrel is expected. Further, a technique to reduce in-plane overlap between fiber bundles to be wound around the mandrel is expected. Further, in the techniques, it is desired to simplify a manufacturing process and to reduce a manufacturing cost.

SUMMARY OF THE INVENTION

The present invention provides a tank manufacturing method, a helical winding device, and a filament winding apparatus.

One aspect of the present invention provides a tank manufacturing method using a helical winding device that winds fiber bundles around a mandrel by helical winding. The helical winding device includes a first guide ring having an opening to pass the mandrel therethrough and placed around the mandrel with an axial center of the mandrel being taken as a center, and a plurality of first guide portions placed in the first guide ring along a circumferential direction around the axial center and configured to supply first fiber bundles to the mandrel. The tank manufacturing method includes: moving the mandrel relative to the first guide ring in an axial center direction along the axial center such that the mandrel passes through the opening; and winding the fiber bundles around the mandrel while relatively moving the mandrel in the moving, by the first guide portions supplying the fiber bundles to the mandrel with the first guide portions swinging in the circumferential direction. According to the tank manufacturing method of the present aspect, the first guide portions wind the first fiber bundles around the mandrel while the first guide portions are swinging in the circumferential direction. This makes it possible to broaden a width of the first fiber bundles thus wound. This makes it possible to reduce occurrence of a gap between fiber bundles adjacent to each other.

In the tank manufacturing method according to the above aspect, the helical winding device may further include a second guide ring having an opening to pass the mandrel therethrough and placed around the mandrel with the axial center of the mandrel being taken as a center such that the second guide ring and the first guide ring are arranged side by side along the axial center direction, and a plurality of second guide portions placed in the second guide ring along the circumferential direction and configured to supply second fiber bundles to the mandrel. The first guide portion and the second guide portion may be placed alternately along the circumferential direction when viewed in a direction along the axial center. The winding may include winding the first fiber bundles around the mandrel by the first guide portions supplying the first fiber bundles to the mandrel with the first guide portions swinging in the circumferential direction, and winding the second fiber bundles around the mandrel by the second guide portions supplying the second fiber bundles to the mandrel in a state where circumferential positions of the second guide portions are fixed. In the tank manufacturing method according to the above aspect, the first fiber bundle wound by use of the first guide portion is wound between the second fiber bundles wound by use of the second guide portions. This broadens a width of the first fiber bundle wound by use of the first guide portion, thereby making it possible to reduce a gap between adjacent fiber bundles. Further, the first fiber bundle is supplied, by use of the first guide portion swinging in the circumferential direction, to between the second fiber bundles wound by use of the second guide portions of which the circumferential positions are fixed. Hereby, misalignment of the first fiber bundles wound by the first guide portions can be limited by the second fiber bundles wound by the second guide portions. Hereby, positions of the first fiber bundles are stabilized, which can restrain adjacent fiber bundles from overlapping with each other.

In the tank manufacturing method according to the above aspect, a relative moving direction of the mandrel in the moving may be a direction where the mandrel moves along the axial center direction from a side where the second guide portions are placed toward a side where the first guide portions are placed. According to the tank manufacturing method according to the above aspect, after the fiber bundles are wound by use of the second guide portions, the fiber bundles wound by use of the first guide portions can be stably placed between the fiber bundles thus wound by the second guide portions. This further stabilizes positions of the fiber bundles wound around the mandrel by use of the first guide portions. This makes it possible to further restrain adjacent fiber bundles from overlapping with each other.

In the tank manufacturing method according to the above aspect, a thickness of the first fiber bundles supplied from the first guide portions may be thinner than a thickness of the second fiber bundles supplied from the second guide portions. According to the tank manufacturing method according to the above aspect, a thin first fiber bundle wound by use of the first guide portion can be placed between thick second fiber bundles wound by use of the second guide portions. Hereby, the positions of the first fiber bundles are further stabilized.

In the tank manufacturing method according to the above aspect, a swinging range of the first guide portion in the circumferential direction may become larger as a diameter of the mandrel becomes larger. Generally, as the diameter of the mandrel becomes larger, a gap between wound fiber bundles becomes larger. According to the tank manufacturing method according to the above aspect, by increasing the swinging range, it is possible to further broaden the width of the first fiber bundles. Accordingly, even if a diameter of a part where the fiber bundles are wound changes, it is possible to reduce a gap between adjacent fiber bundles appropriately according to the part where the fiber bundles are wound.

Another aspect of the present invention provides a helical winding device that winds fiber bundles around a mandrel by helical winding. The helical winding device includes: a first guide ring having an opening to pass the mandrel therethrough; a plurality of first guide portions placed in the first guide ring along a circumferential direction around an axial center of the mandrel and configured to supply first fiber bundles to the mandrel; and a swing mechanism configured to swing the first guide portions in the circumferential direction. According to the helical winding device of the above aspect, the first fiber bundles can be wound around the mandrel while the first guide portions are swung by the swing mechanism in the circumferential direction. This can broaden a width of the first fiber bundles having been wound by use of the first guide portions, thereby making it possible to reduce a gap between adjacent fiber bundles.

The helical winding device may further include: a second guide ring having an opening to pass the mandrel therethrough and placed such that the second guide ring and the first guide ring are arranged side by side in an axial center direction along the axial center; and a plurality of second guide portions placed in the second guide ring along the circumferential direction and configured to supply second fiber bundles to the mandrel. The first guide portions and the second guide portions may be placed alternately along the circumferential direction when viewed in the axial center direction. Circumferential positions of the second guide portions may be fixed. According to the helical winding device of the above aspect, the first fiber bundle wound by use of the first guide portion can be wound between the second fiber bundles wound by use of the second guide portions. This broadens a width of the first fiber bundle, thereby making it possible to reduce a gap between adjacent fiber bundles. Further, the first fiber bundle can be supplied, by use of the first guide portion swinging in the circumferential direction, to between the second fiber bundles wound by use of the second guide portions of which the circumferential positions are fixed, so that movement of a position of the first fiber bundle can be limited by the second fiber bundles. Hereby, the positions of the first fiber bundles are stabilized, which can restrain adjacent fiber bundles from overlapping with each other.

In the helical winding device of the above aspect, a thickness of the first fiber bundles supplied from the first guide portions may be thinner than a thickness of the second fiber bundles supplied from the second guide portions. According to the helical winding device of the above aspect, a thin first fiber bundle wound by use of the first guide portion can be placed between thick second fiber bundles wound by use of the second guide portions. This further stabilizes positions of the first fiber bundles wound around the mandrel.

In the helical winding device of the above aspect, the swing mechanism may increase a swinging range of the first guide portions in the circumferential direction as a diameter of the mandrel becomes larger. According to the helical winding device of the above aspect, by increasing the swinging range, it is possible to further broaden the width of the first fiber bundles. Accordingly, even if a diameter of a part where the fiber bundles are wound changes, it is possible to reduce a gap between adjacent fiber bundles appropriately according to the part where the fiber bundles are wound.

Note that the present invention can be realized in various aspects. For example, the present invention can be realized in aspects such as a filament winding apparatus including a helical winding device, a tank manufactured by use of the device of the above aspect, a computer program to implement the manufacturing method of the above aspect, a non-temporary recording medium that stores the computer program therein, and the like.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3 is a view to describe hoop winding;

DETAILED DESCRIPTION OF EMBODIMENTS

A. Embodiment

Figure 1:
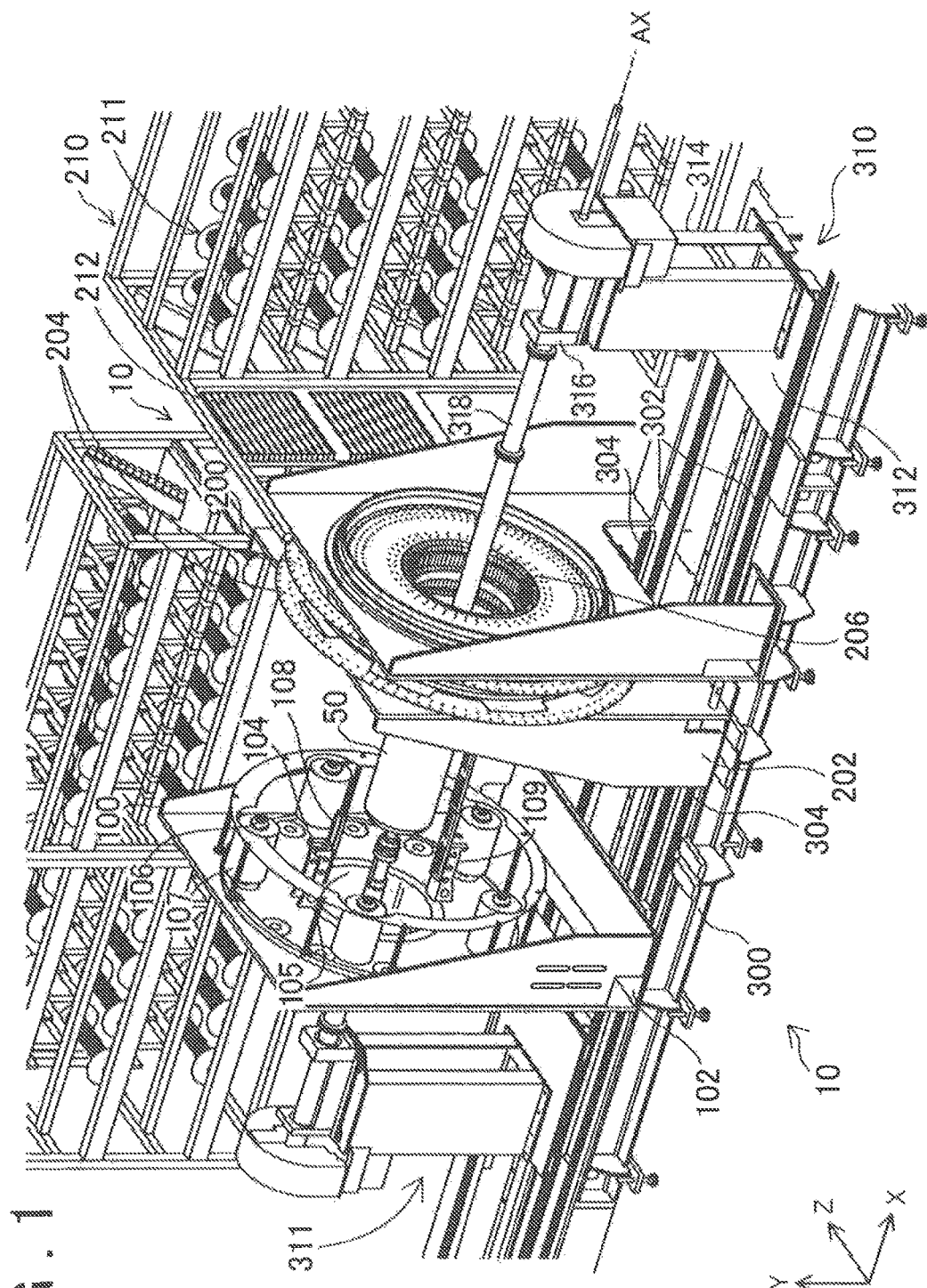
FIG. 1 is a perspective view illustrating an appearance configuration of a fiber winding apparatus as one embodiment of the present invention.

FIG. 1 is a perspective view illustrating an appearance configuration of a fiber winding apparatus as one embodiment of the present invention. A fiber winding apparatus 10 is an apparatus that winds fiber bundles around a mandrel 50 by a filament winding method. In the present embodiment, the fiber bundle to be wound around the mandrel 50 is formed by bundling a plurality (e.g., 20,000) of filaments having a diameter of around several micrometers. Further, the fiber bundle is a set of carbon fibers (so-called prepreg) impregnated with thermo setting resin. In the present embodiment, epoxy resin is used as the thermo setting resin. Further, in the present embodiment, polyacrylonitrile (PAN) carbon fiber is used as the carbon fiber. Note that, instead of polyacrylonitrile (PAN) carbon fiber, other given prepregs such as rayon carbon fiber and pitch carbon fiber can be used.

The mandrel 50 is constituted by a resin molded product in the present embodiment. Note that, instead of the resin molded product, the mandrel 50 may be made of a high-strength metal material such as an aluminum material or a stainless material. The mandrel 50 has a capsule shape (a tank-container shape). More specifically, the mandrel 50 includes: a body portion formed in a central part of the mandrel 50 in a direction of an axial center AX; and dome portions formed continuously with both ends of the body portion, respectively. A round head portion of at least one of two dome portions placed at both ends of the mandrel 50 includes a cap portion (not shown). In the present embodiment, a high pressure gas tank is manufactured by use of the mandrel 50 around which fiber bundles are wound. The high pressure gas tank is used as a holding tank for hydrogen gas as fuel gas in a fuel-cell vehicle, for example. The cap portion is used to accumulate hydrogen gas into the tank and to discharge the hydrogen gas from the tank. Note that FIG. 1 illustrates an X-axis, a Y-axis, and a Z-axis. The X-axis is parallel to the direction of the axial center AX of the mandrel 50. The Y-axis is parallel to a vertical direction. Note that a −Y-axis direction corresponds to a vertically downward direction. The Z-axis is parallel to a horizontal direction.

The fiber winding apparatus 10 includes a creel device 210, a base 300, a hoop winding device 100, and a helical winding device 200.

The creel device 210 includes many bobbins 211 around which fiber bundles are wound, and a yarn supply guide 212. A fiber bundle is supplied to the helical winding device 200 from each of the bobbins 211 through the yarn supply guide 212. As illustrated in FIG. 1, the creel device 210 is placed in parallel with the base 300.

The base 300 is extended along the X-axis direction, and includes a first rail 302, a second rail 304, a first support base 310, and a second support base 311. The first rail 302 and the second rail 304 are a pair of grooves formed on a top face of the base 300 so as to be parallel to each other, and are extended in a longitudinal direction (a direction along the X-axis direction) of the base 300. The second rail 304 is placed so as to sandwich the first rail 302.

The first support base 310 supports the mandrel 50, together with the second support base 311. The first support base 310 is placed on the top face of the base 300 so as to be placed on a +X-axis direction side relative to the helical winding device 200. The first support base 310 is driven by a drive mechanism (not shown) so as to reciprocate on the first rail 302. The first support base 310 includes a base 312, a support arm 314, a chuck 316, and a mounting jig 318. The base 312 is a plate-shaped member, and is placed in a slidable manner relative to the first rail 302. The support arm 314 has a square columnar appearance shape with the Y-axis direction being taken as a longitudinal direction, and extends upward from the base 312. The chuck 316 is provided in an upper end of the support arm 314, that is, an end part on an opposite side to that side of the support arm 314 which is fixed to the base 312. The chuck 316 fixes the mounting jig 318. The mounting jig 318 is a generally stick-shaped jig, and supports the mandrel 50. More specifically, one end part of the mounting jig 318 holds the dome portion of the mandrel 50, and the other end part thereof is fixed to the chuck 316. Hereby, the mandrel 50 can be held relative to the first support base 310. The mounting jig 318 can be rotated by a driver mechanism (not shown) around the axial center AX. Because of this, the mandrel 50 supported by the mounting jig 318 can be rotated around the axial center AX together with the mounting jig 318.

The second support base 311 supports the mounting jig 318, and supports the mandrel 50 together with the first support base 310. The second support base 311 is different from the first support base 310 only in that the second support base 311 is placed on a −X-axis direction side relative to the hoop winding device 100. Accordingly, a detailed description thereof is omitted.

The hoop winding device 100 is placed on the top face of the base 300, and winds fiber bundles around the mandrel 50 by hoop winding. The hoop winding device 100 includes a frame 102, a winding and hanging table 104, five holders 106, and five bobbins 107. The frame 102 is a housing configured to accommodate each member of the hoop winding device 100. The frame 102 is driven by a drive mechanism (not shown) so as to reciprocate on the second rail 304.

The winding and hanging table 104 has a disciform appearance shape, and is fixed to the frame 102 so that a thickness direction of the winding and hanging table 104 is parallel to the X-axis. An opening 105 is formed in a center of the winding and hanging table 104 so as to penetrate therethrough in a thickness direction. The opening 105 allows the mandrel 50 to pass therethrough, and the mandrel 50 is placed in the opening 105 at the time when fiber bundles are wound around the mandrel 50. A center of the opening 105 is placed on the axial center AX, and the mounting jig 318 penetrates through the opening 105. The winding and hanging table 104 includes a first guide yarn supply portion 108 and a second guide yarn supply portion 109 in the vicinity of the opening 105. The first guide yarn supply portion 108 and the second guide yarn supply portion 109 are placed so as to project from the winding and hanging table 104 toward the +X-axis direction. The first guide yarn supply portion 108 is placed on an upper side (+Y-axis direction) relative to the mandrel 50. The second guide yarn supply portion 109 is placed on a lower side (−Y-axis direction) relative to the mandrel 50. The first guide yarn supply portion 108 and the second guide yarn supply portion 109 supply fiber bundles to the mandrel 50.

The five holders 106 are arranged in an annular shape so as to surround the opening 105. Each of the holders 106 accommodates one bobbin 107 therein. A fiber bundle is wound around the bobbin 107 in advance, like the bobbin 211. Each of the holders 106 is rotationally driven by a drive mechanism (not shown), so as to supply the fiber bundle from the bobbin 107 to the first guide yarn supply portion 108 and the second guide yarn supply portion 109.

The helical winding device 200 is placed on the top face of the base 300, and winds fiber bundles around the mandrel 50 by helical winding. The helical winding device 200 includes a frame 202 and a yarn supply ring portion 204 as a guiding ring portion. The frame 202 is a housing accommodating the yarn supply ring portion 204 therein. The mandrel 50 is driven by a drive mechanism (not shown) so as to reciprocate in the yarn supply ring portion 204.

Figure 2:
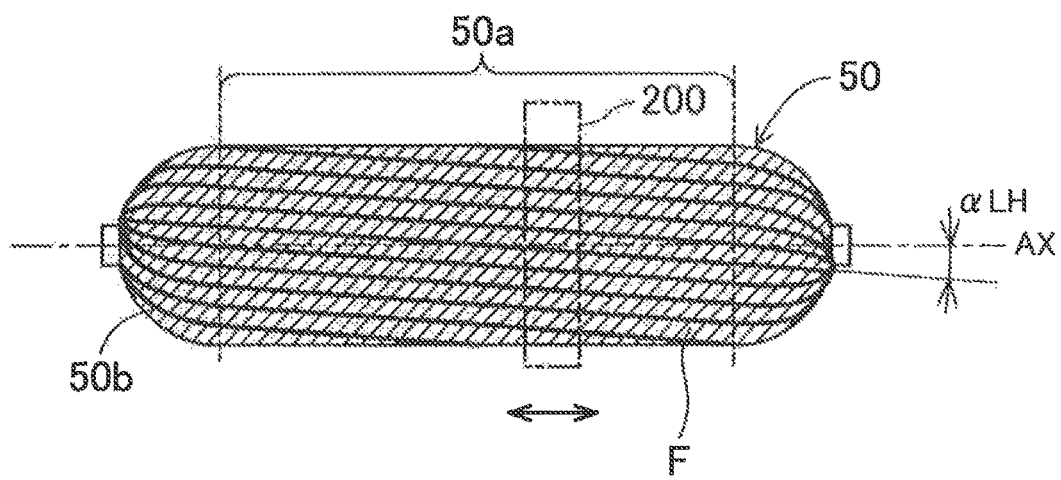
FIG. 2 is a view to describe helical winding.

The yarn supply ring portion 204 has an appearance shape of a generally pillar shape of which a thickness direction is parallel to the X-axis. An axis of the yarn supply ring portion 204 coincides with the axial center AX of the mandrel 50. An opening 206 is formed in a center of the yarn supply ring portion 204 so as to penetrate therethrough in the thickness direction. The mandrel 50 can be placed in the opening 206. A plurality of guide portions (not shown) configured to supply fiber bundles to the mandrel 50 is placed on an inner wall of the yarn supply ring portion 204 having the opening 206. Many fiber bundles are sent out from the guide portions toward the mandrel 50. Note that a detailed configuration of the helical winding device 200 will be described later FIG. 2 is a view to describe the helical winding. The helical winding is such that a winding locus of a fiber bundle F intersects with the axial center AX at a fiber angle αLH (e.g., approximately 11° to 25°), which is a low angle. That is, the fiber bundle F using the helical winding is wound helically repeatedly so as to go over the dome portions 50$b$ placed at both ends of the body portion 50$a$ of the mandrel 50. In the dome portions 50$b$ at both sides, a fiber winding direction is turned around along with changeover between a first half and a second half of the mandrel 50 and a turning position from the axial center AX is also adjusted. At the time when the helical winding is performed, the mandrel 50 rotates around the axial center AX, and reciprocates so as to pass through the opening 206 along the direction of the axial center AX. Hereby, a helical layer formed by the helical winding is formed.

FIG. 3 is a view to describe the hoop winding. The hoop winding is such that a winding locus of a fiber bundle F intersects with the axial center AX at generally right angles (e.g., a fiber angle α0 is approximately 89°). The hoop winding is performed on the body portion 50$a$. At the time when the hoop winding is performed, the hoop winding device 100 reciprocates along the direction of the axial center AX, and the mandrel 50 rotates around the axial center AX. Hereby, a hoop layer formed by the hoop winding is formed. By forming a reinforcing layer by laminating a plurality of hoop layers and helical layers around the mandrel, a tank having an improved strength is manufactured.

Figure 4:
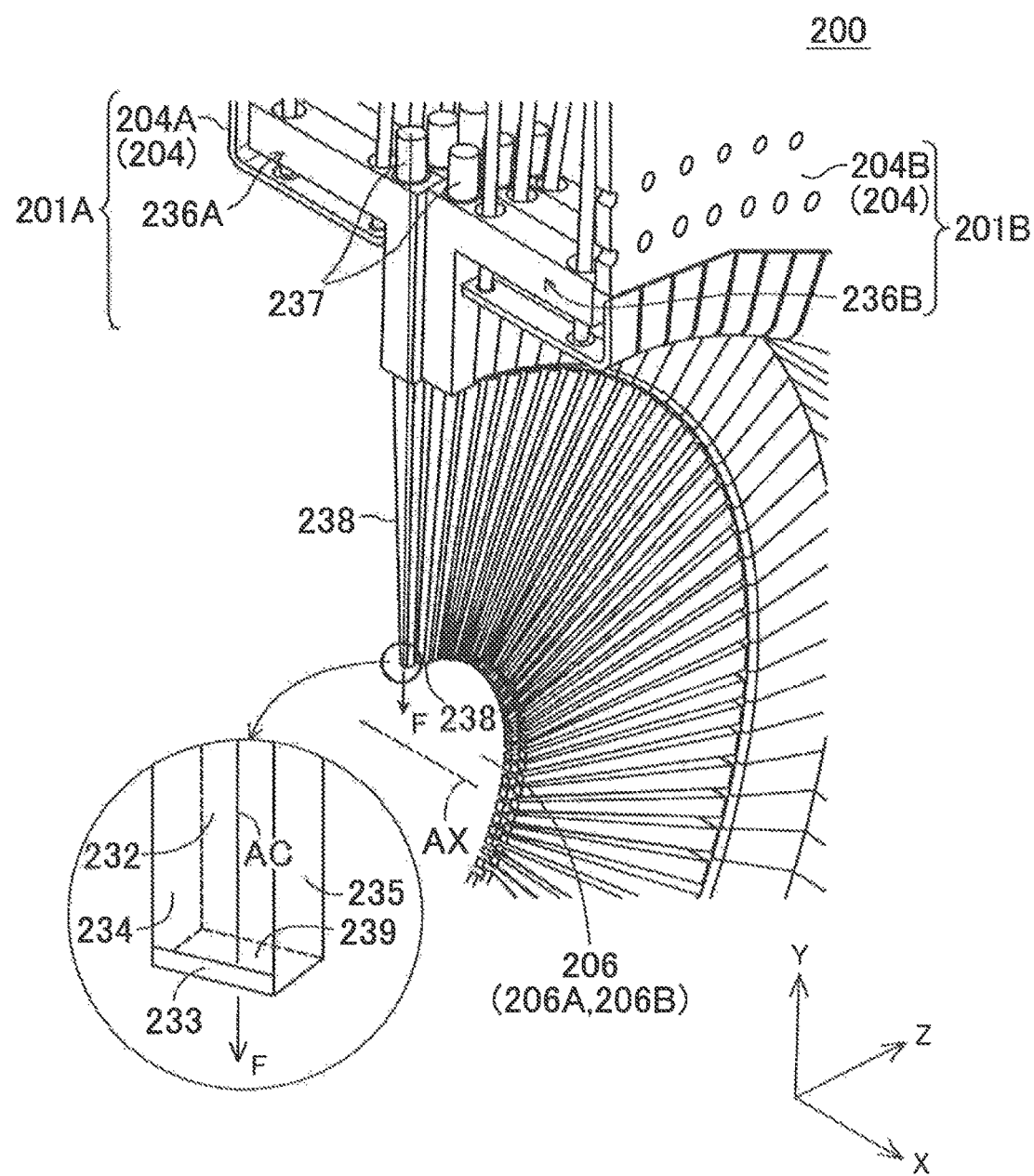
FIG. 4 is a view to describe a detail of a helical winding device.

FIG. 4 is a view to describe a detail of the helical winding device 200. FIG. 4 is a perspective view illustrating part of the helical winding device 200. The helical winding device 200 includes a movable side helical unit 201A, and a fixed side helical unit 201B. The movable side helical unit 201A and the fixed side helical unit 201B are arranged side by side along the direction of the axial center AX (the X-axis direction).

The movable side helical unit 201A includes a first guide ring 204A constituting the yarn supply ring portion 204, and a plurality of first guide portions 236A configured to supply fiber bundles F to the mandrel 50. The first guide ring 204A has an opening 206A to pass the mandrel 50 therethrough. The opening 206A constitutes the opening 206 of the yarn supply ring portion 204. The first guide ring 204A may be placed around the mandrel 50 with the axial center AX of the mandrel 50 being taken as a center.

The plurality of first guide portions 236A is fixed to the first guide ring 204A at given intervals along a circumferential direction around the axial center AX. For example, 50 to 300 first guide portions 236A are placed. The first guide ring 204A can be swung by the after-mentioned drive mechanism within a predetermined range along the circumferential direction around the axial center AX. In association with movement of the first guide ring 204A, the plurality of first guide portions 236A also swings along the circumferential direction.

The fixed side helical unit 201B includes a second guide ring 204B constituting the yarn supply ring portion 204, and a plurality of second guide portions 236B configured to supply fiber bundles F to the mandrel 50. The second guide ring 204B has an opening 206B to pass the mandrel 50 therethrough. The opening 206B constitutes the opening 206 of the yarn supply ring portion 204. The second guide ring 204B may be placed around the mandrel 50 with the axial center AX of the mandrel 50 being taken as a center. The second guide ring 204B and the first guide ring 204A are arranged side by side in a direction along the axial center AX.

The plurality of second guide portions 236B is fixed to the second guide ring 204B at given intervals along the circumferential direction around the axial center AX. For example, 50 to 300 second guide portions 236B are placed. In the present embodiment, the number of first guide portions 236A is the same as the number of second guide portions 236B. A circumferential position of the second guide ring 204B is fixed, which is different from the first guide ring 204A. That is, the plurality of second guide portions 236B is fixed without their circumferential positions being displaced.

Here, the first guide portion 236A and the second guide portion 236B have the same configuration to supply fiber bundles F to the mandrel 50. In view of this, the following describes the configuration to supply the fiber bundles F in the first and second guide portions 236A, 236B, with reference to the first guide portion 236A.

The first guide portion 236A includes an introduction portion 237 configured to introduce a fiber bundle F into the first guide portion 236A, and a supply portion 238 configured to supply the fiber bundle F to the mandrel 50. A supply passage of the fiber bundle F from the introduction portion 237 to the supply portion 238 is straight. The introduction portion 237 has a tubular shape. The supply portion 238 has a recessed shape. The supply portion 238 includes a bottom face portion 232 forming a bottom portion of the recessed shape, and a first side face portion 234 and a second side face portion 235 forming side face portions of the bottom face portion 232. Further, an upper face portion 233 connecting the first and second side face portions 234, 235 to each other is formed on a tip end of the supply portion 238. Hereby, a tip opening 239 of the supply portion 238 has a frame shape. The fiber bundle F is supplied to the mandrel 50 through the tip opening 239.

Respective tip openings 239 of the plurality of first guide portions 236A are placed so as to face the same direction relative to an outer surface of the body portion 50$a$ (FIG. 2) of the mandrel 50 to which the respective tip openings 239 are opposed. That is, the respective tip openings 239 are opened toward a predetermined one point that passes the axial center AX, and rotation positions of the supply portions 238 around respective central axes AC of the supply portions 238 are the same. In other words, when the tip openings 239 are rotated in the circumferential direction around the predetermined one point, the tip openings 239 overlap with each other. This makes it possible to restrain overlap between the fiber bundles to be wound by the helical winding. Here, if the fiber bundles supplied to the mandrel 50 overlap with each other due to slipping or the like, a step or a gap due to the step may be caused. This may cause a decrease in tank performance, such as a decrease in tank strength. However, in the present embodiment, since overlap between the fiber bundles can be restrained, it is possible to restrain the decrease in tank performance.

Widths of respective fiber bundles F supplied from the first guide portion 236A and from the second guide portion 236B are the same. Further, a thickness of a fiber bundle F (also referred to as a "first fiber bundle F1") supplied from the first guide portion 236A is thinner than a thickness of a fiber bundle F (also referred to as a "second fiber bundle F2") supplied from the second guide portion 236B. For example, the thickness of the first fiber bundle F1 is preferably not more than half of the thickness of the second fiber bundle F2, and more preferably not more than one-third of the thickness of the second fiber bundle F2. Hereby, a position of the first fiber bundle F1 is stabilized by the second fiber bundle F2. Note that the first fiber bundle F1 and the second fiber bundle F2 may have different widths. Here, the widths of the first fiber bundle F1 and the second fiber bundle F2 are widths just after the first fiber bundle F1 and the second fiber bundle F2 are wound around the mandrel 50.

Figure 5:
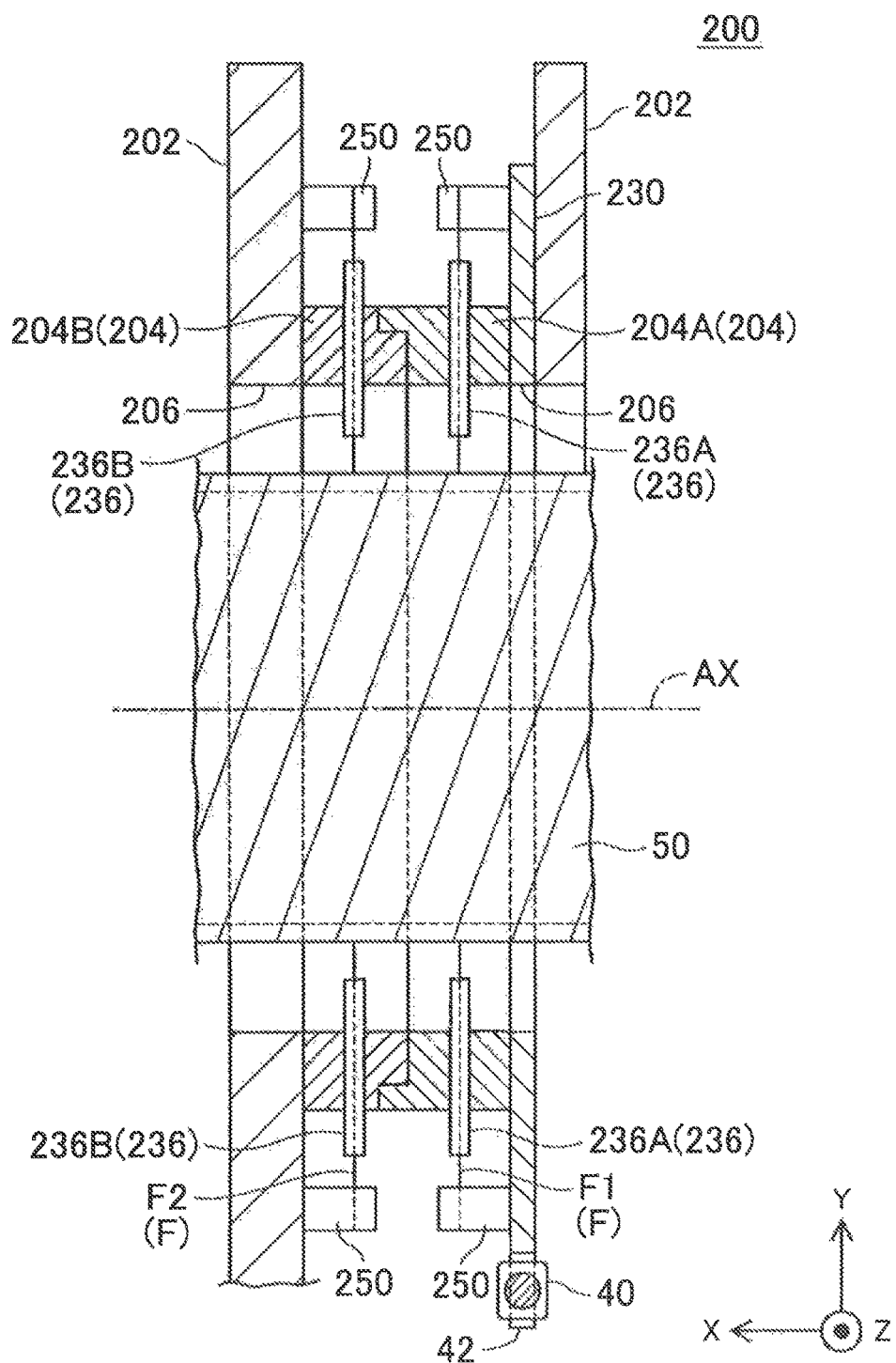
FIG. 5 is a front view of the helical winding device.
Figure 6:
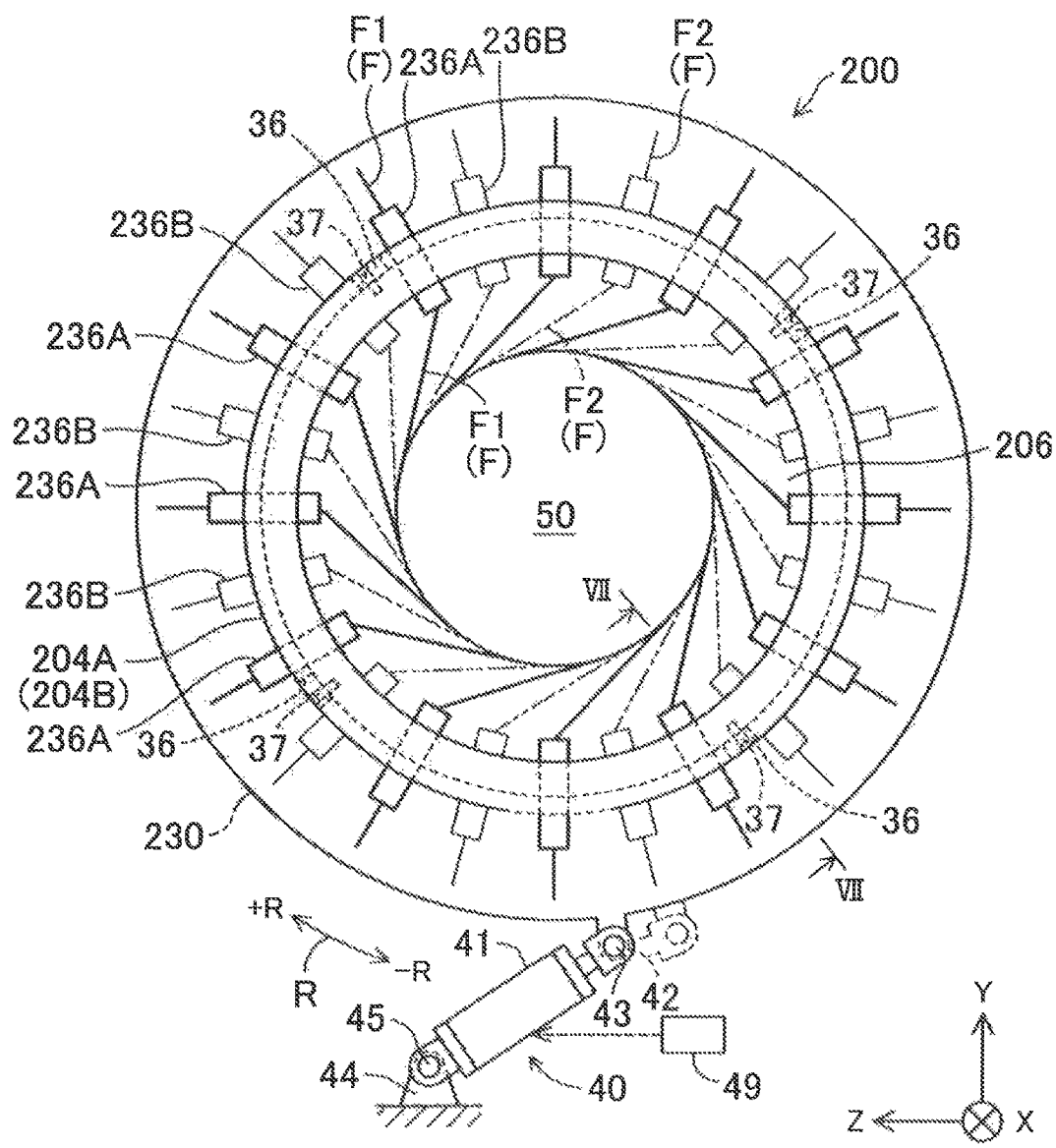
FIG. 6 is a side view of the helical winding device.
Figure 7:
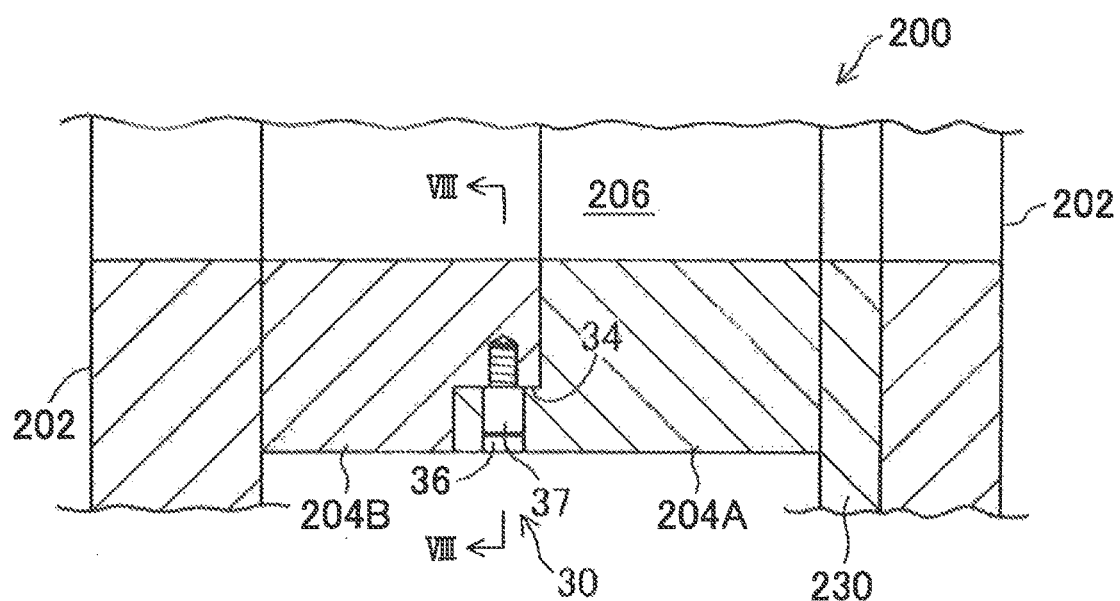
FIG. 7 is a sectional view taken along a line VII-VII in FIG. 6.
Figure 8:
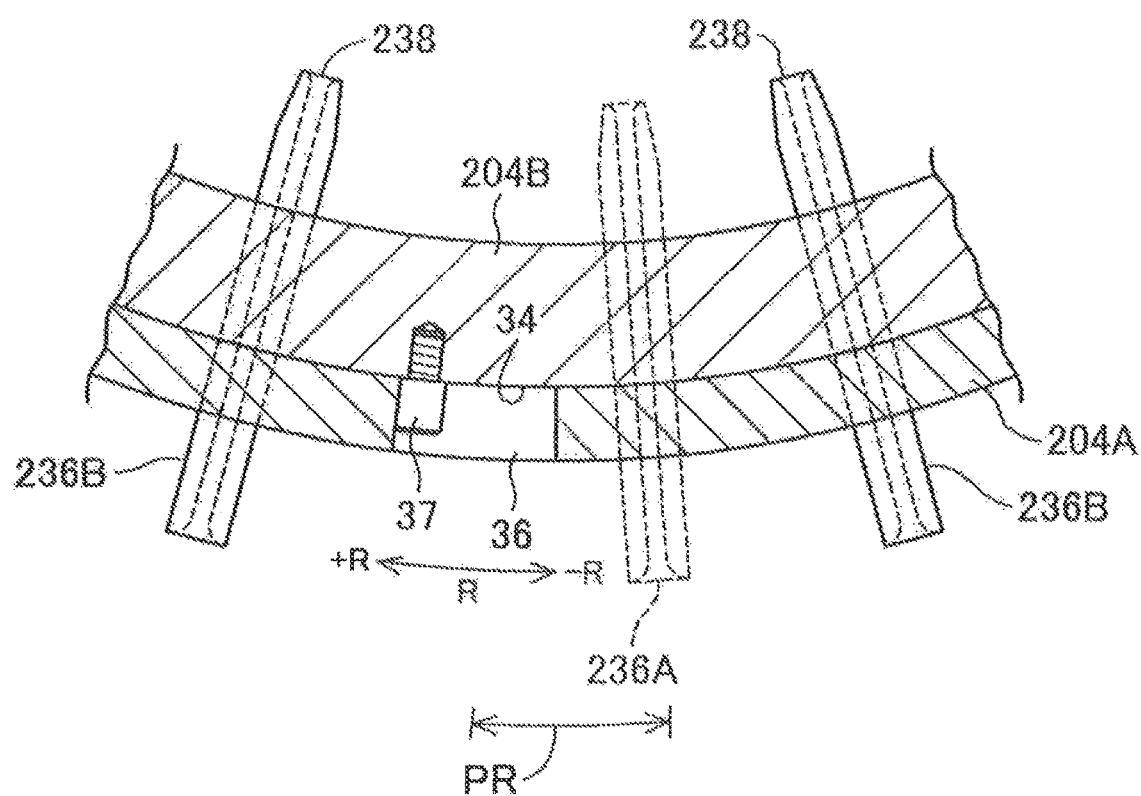
FIG. 8 is a view to describe the helical winding device.

FIGS. 5 to 8 are views to describe the helical winding device 200. FIGS. 5 to 8 schematically illustrate the helical winding device 200. FIG. 5 is a front view of the helical winding device 200. FIG. 6 is a side view of the helical winding device 200. FIG. 7 is a partial sectional view taken along a line VII-VII in FIG. 6. FIG. 8 is a sectional view taken along a line VIII-VIII in FIG. 7.

As illustrated in FIG. 5, the helical winding device 200 further includes a plurality of guide rollers 250, an auxiliary frame 230, and a swing mechanism 40. The guide rollers 250 are provided for the first guide portion 236A and for the second guide portion 236B. The guide roller 250 guides a fiber bundle F supplied from the bobbin 211 of the creel device 210 (FIG. 1) to a corresponding guide portion (the first guide portion 236A or the second guide portion 236B). The guide roller 250 is fixed to the frame 202 or the auxiliary frame 230.

The auxiliary frame 230 is provided in the movable side helical unit 201A. The auxiliary frame 230 fixes the first guide ring 204A. The auxiliary frame 230 has a toric shape, and a through hole to form the opening 206 is formed in a center of the auxiliary frame 230. Note that the second guide ring 204B is fixed to the frame 202.

As illustrated in FIG. 6, when the helical winding device 200 is viewed in the direction of the axial center AX (the X-axis direction), the first guide portions 236A and the second guide portions 236B are placed alternately along the circumferential direction. That is, one second guide portion 236B is placed between two first guide portions 236A adjacent to each other. Further, regardless of circumferential displacement of the first guide portions 236A due to the swing mechanism 40, the first guide portions 236A and the second guide portions 236B have the above relationship.

The swing mechanism 40 includes a hydraulic cylinder 41 and a controlling portion 49. An end part 43 of a piston rod of the hydraulic cylinder 41 is connected to a bracket 42 provided in the auxiliary frame 230. A cylinder-side end part 45 of the hydraulic cylinder 41 is connected to a bracket 44 provided on a bottom of the frame 202. The controlling portion 49 elongates and contracts the piston rod of the hydraulic cylinder 41. Hereby, when the auxiliary frame 230 swings in a circumferential direction R, the first guide portions 236A also swing along the circumferential direction R.

As illustrated in FIG. 7, the helical winding device 200 includes a limitation mechanism 30 configured to limit a swinging range of the first guide portions 236A in the circumferential direction R to a predetermined range. The predetermined range is set to be at least less than a distance (pitch) between the second guide portions 236B (FIG. 6) adjacent to each other in the circumferential direction. That is, the swinging range is limited by the limitation mechanism 30 so that the first guide portion 236A is always placed between the second guide portions 236B adjacent to each other in the circumferential direction R. Since the limitation mechanism 30 can prevent the first guide portion 236A and the second guide portion 236B from overlapping with each other in the circumferential direction R, thereby making it possible to reduce such a possibility that respective fiber bundles F supplied from the first guide portion 236A and the second guide portion 236B overlap with each other.

As illustrated in FIG. 7, the limitation mechanism 30 includes a bolt 37 as a first limitation portion and a groove 36 as a second limitation portion. Due to the bolt 37 and the groove 36, a moving range (swinging range) of the first guide ring 204A in the circumferential direction R is limited to a predetermined range PR (FIG. 8). As illustrated in FIG. 6, four bolts 37 and four grooves 36 are provided. Further, in the present embodiment, respective units of the bolt 37 and the groove 36 are placed at even intervals in the circumferential direction.

As illustrated in FIG. 8, one end of the bolt 37 is embedded in the second guide ring 204B from a ring-peripheral-surface-34 side formed in the second guide ring 204B over the circumferential direction. The other end of the bolt 37 is placed in the groove 36.

In a case where the first guide ring 204A is rotated by the swing mechanism 40 in the circumferential direction R, the bolt 37 abuts with a side face portion of the groove 36 in the circumferential direction R, so that the moving range of the first guide ring 204A in the circumferential direction R is limited to the predetermined range PR.

As described above, the first guide portions 236A are rotationally moved by the swing mechanism 40 in a positive rotation direction +R, which is clockwise, and a negative rotation direction −R, which is counterclockwise, in FIG. 8. The movements due to the positive rotation and the negative rotation are repeated alternately within the predetermined range PR. Hereby, the first guide portions 236A swing in the circumferential direction R. Here, as for a speed of the first guide portions 236A to be swung by the swing mechanism 40 in the circumferential direction R, the number of times of combinatorial operation of one positive rotation and one negative rotation within the predetermined range PR is preferably at least once for one second, and more preferably around 2 to 3 times, for example. By increasing the number of times of operation to swing in the circumferential direction R so that the first guide portions 236A are oscillated, it is possible to broaden a width of the first fiber bundles F1 more stably.

Figure 9:
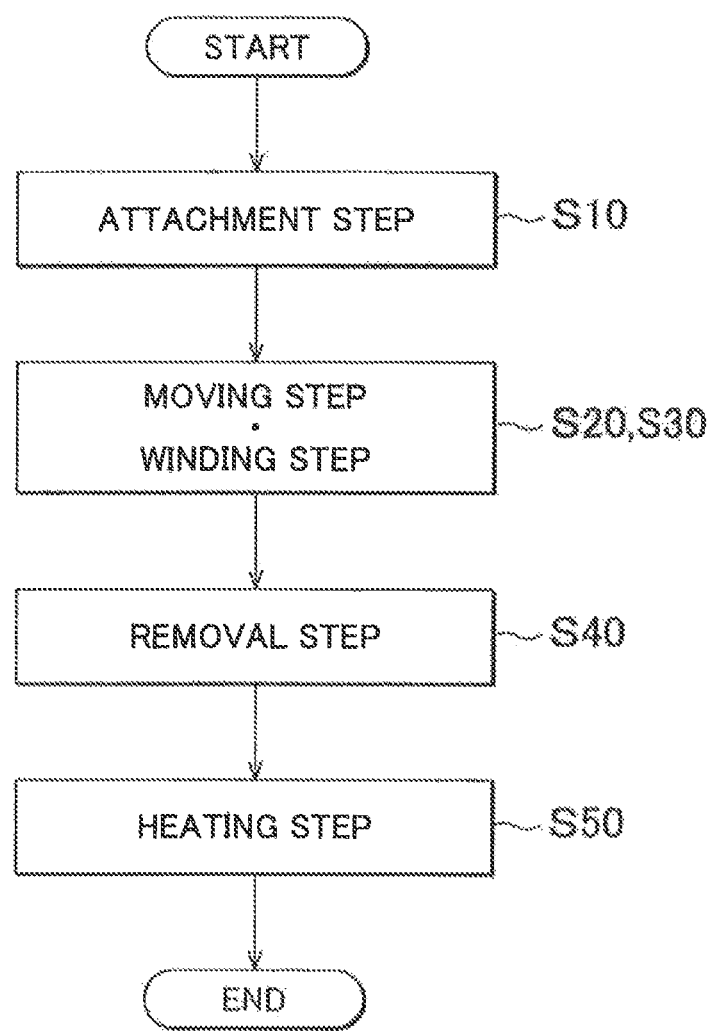
FIG. 9 is a flowchart to describe a tank manufacturing method.

FIG. 9 is a flow diagram to describe a tank manufacturing method. First, the mandrel 50 is attached to the fiber winding apparatus 10 (FIG. 1) (step S10: an attachment step). In a process of step S10, the mandrel 50 is supported by the mounting jig 318 (FIG. 1). Then, while the mandrel 50 is rotated around the axial center AX, the mandrel 50 is moved relative to the fiber winding apparatus 10 along the direction of the axial center AX (step S20: a moving step). Further, while the step S20 is performed, a helical layer and a hoop layer are laminated on the mandrel 50 in a predetermined order by use of the fiber winding apparatus 10 (step S30: a winding step). For example, a hoop layer is formed on a surface of the mandrel 50, a helical layer is formed on the hoop layer, and a hoop layer is further formed on the helical layer.

When the hoop layer is formed, the hoop winding device 100 is reciprocated along the direction of the axial center AX so that the mandrel 50 passes through the opening 105 (FIG. 1). Then, fiber bundles F are wound around the body portion 50a (FIG. 3) of the mandrel 50 by hoop winding. Hereby, the hoop layer is formed.

When the helical layer is formed, the mandrel 50 is reciprocated along the direction of the axial center AX so that the mandrel 50 passes through the opening 206 (FIG. 1). Then, fiber bundles F are supplied from the first guide portions 236A to the mandrel 50 with the first guide portions 236A being swung by the swing mechanism 40 in the circumferential direction R, and fiber bundles F are supplied from the second guide portions 236B to the mandrel 50. Hereby, the helical layer is formed.

After the hoop layer and the helical layer are laminated on the mandrel 50, the mandrel 50 is removed from the fiber winding apparatus 10 (step S40: a removal step). After step S40, the mandrel 50 is heated (step S50: a heating step). Hereby, thermo setting resin impregnated in the fiber bundles F is cured, so that a tank provided with a reinforcing member is manufactured.

Figure 10:
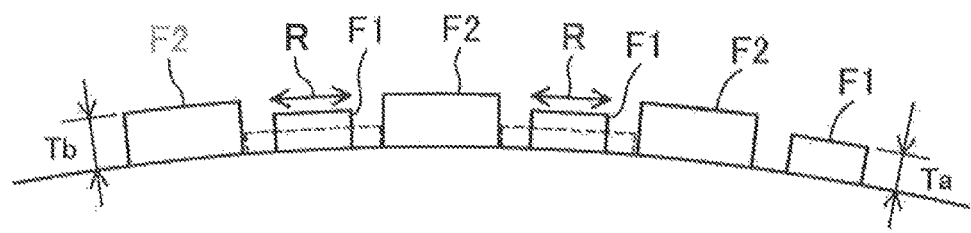
FIG. 10 is a view to describe one effect of the above embodiment.

FIG. 10 is a view to describe one effect of the above embodiment. When the first fiber bundles F1 are wound around the mandrel 50, the helical winding device 200 of the present embodiment supplies the first fiber bundles F1 to the mandrel 50 while the first guide portions 236A being swinging in the circumferential direction R. Hereby, the width of the first fiber bundles F1 after they are wound around the mandrel 50 by the first guide portions 236A can be broadened as indicated by broken lines in FIG. 10. This makes it possible to reduce occurrence of a gap between adjacent fiber bundles F (the first fiber bundle F1 and the second fiber bundle F2).

Further, in the above embodiment, the second fiber bundles F2 are wound around the mandrel 50 in a state where the positions, in the circumferential direction R, of the second guide portions 236B of the helical winding device 200 are fixed. Hereby, as illustrated in FIG. 10, misalignment of the first fiber bundles F wound by the first guide portions 236A can be limited by the second fiber bundles F wound by the second guide portions. Hereby, the positions of the first fiber bundles F1 wound by use of the first guide portions 236A are stabilized, which can restrain adjacent fiber bundles F from overlapping with each other.

Further, a thickness Ta of the first fiber bundle F1 to be supplied to the mandrel 50 is thinner than a thickness Tb of the second fiber bundle F2 to be supplied to the mandrel 50. Hereby, the thin first fiber bundle F1 wound by use of the first guide portion 236A can be placed between the thick second fiber bundle F2 wound by use of the second guide portions 236B. This further stabilizes positions of the fiber bundles wound around the mandrel 50 by use of the first guide portions 236A. That is, even in a case where the width of the first fiber bundle F1 is broadened due to swinging of the first guide portion 236A in the circumferential direction R, it is possible to reduce a possibility that the first fiber bundle F1 with the broadened width mounts its adjacent second fiber bundles F2. This makes it possible to further reduce a possibility that adjacent fiber bundles F overlap with each other.

Here, when the fiber bundles F are wound around the mandrel 50 by use of the helical winding device 200, it is preferable that the first fiber bundles F1 be wound after the second fiber bundles F2 are wound. That is, at the time when the mandrel 50 moves from a side where the plurality of second guide portions 236B (FIG. 5) is placed toward a side where the plurality of first guide portions 236A is placed, the fiber bundles F are wound around the mandrel 50 by use of the helical winding device 200. Hereby, after the second fiber bundles F2 are wound by the second guide portions 236B, the first fiber bundles F1 can be wound by the first guide portions 236A.

In a case where the first fiber bundles F1 are first wound around the mandrel 50, the first fiber bundles F1 may be broadened excessively, because the second fiber bundle F2 have not been placed yet. In this case, the second fiber bundles F2 may be wound on the first fiber bundles F1. However, in a case where the second fiber bundles F2 are first wound around the mandrel 50, and then, the first fiber bundles F1 are wound between adjacent second fiber bundles F2, it is possible to restrain that the first fiber bundles F1 from being broadened excessively, so that the positions of the first fiber bundles F1 are further stabilized. This makes it possible to further restrain adjacent fiber bundles from overlapping with each other.

Further, the moving range (the swinging range) of the first guide portions 236A may be uniform, or may be changed within the predetermined range PR depending on a shape of the mandrel 50. For example, the moving range may be increased as that diameter of the mandrel 50 which is perpendicular to the direction of the axial center AX becomes larger. For example, in a case where the first fiber bundles F1 are supplied onto the body portion 50a (FIG. 2), the moving range is increased as compared with a case where the first fiber bundles F1 are supplied onto the body portion 50a. Generally, as the diameter of the mandrel 50 becomes larger, a gap between wound fiber bundles F becomes larger. By increasing the moving range, it is possible to further broaden the width of the first fiber bundles F1. Accordingly, even if a diameter of a part where the fiber bundles are wound changes, it is possible to reduce a gap between adjacent fiber bundles F appropriately according to the part where the fiber bundles are wound. The moving range may be controlled by the swing mechanism 40.

B. Modification

B-1. First Modification

In the above embodiment, members having the frame-shaped tip opening 239 are used as the first and second guide portions 236A, 236B. However, the present invention is not limited to this. For example, those parts of the first and second guide portions 236A, 236B which guide the fiber bundles F may be formed in a tubular shape.

B-2. Second Modification

As illustrated in FIG. 10, the thickness Ta of the first fiber bundle F1 used herein is thinner than the thickness Tb of the second fiber bundle F2. However, the present invention is not limited to this. The first fiber bundle F1 and the second fiber bundle F2 may have the same thickness, or the thickness Tb may be thinner than the thickness Ta.

B-3. Third Modification

In the above embodiment, the helical winding device 200 includes the limitation mechanism 30 (FIG. 7) configured to limit the swinging range of the first guide portions 236A, but the limitation mechanism 30 may not be provided. For example, instead of the limitation mechanism 30, the controlling portion 49 of the swing mechanism 40 may control the swinging range within the predetermined range.

B-4. Fourth Modification

In the above embodiment, the swing mechanism 40 swings the first guide portions 236A by use of the hydraulic cylinder 41. However, the present invention is not limited to this. The swing mechanism 40 may swing the first guide portions 236A by use of other actuators.

What is claimed is:

1. A tank manufacturing method using a helical winding device that winds fiber bundles around a mandrel by helical winding, the helical winding device including a first guide ring having an opening to pass the mandrel therethrough and placed around the mandrel with an axial center of the mandrel being taken as a center of the first guide ring, and a plurality of first guide portions placed in the first guide ring along a circumferential direction around the axial center and configured to supply first fiber bundles to the mandrel, the method comprising:
   moving the mandrel relative to the first guide ring in an axial center direction along the axial center such that the mandrel passes through the opening; and
   winding the fiber bundles around the mandrel continuously while at the same time moving the mandrel, such that the first guide portions supply the first fiber bundles to the mandrel continuously while the first guide portions swing in the circumferential direction.

2. The tank manufacturing method according to claim 1, wherein:
   the helical winding device further includes
   a second guide ring having an opening to pass the mandrel therethrough and placed around the mandrel with the axial center of the mandrel being taken as a center of the second guide ring, such that the second guide ring and the first guide ring are arranged side by side in a direction along the axial center, and
   a plurality of second guide portions placed in the second guide ring along the circumferential direction and configured to supply second fiber bundles to the mandrel;
   the first guide portions and the second guide portions are placed alternately along the circumferential direction when viewed in the axial center direction; and
   the winding includes winding the first fiber bundles around the mandrel by the first guide portions supplying the first fiber bundles to the mandrel with the first guide portions swinging in the circumferential direction, and winding the second fiber bundles around the mandrel by the second guide portions supplying the second fiber bundles to the mandrel in a state where circumferential positions of the second guide portions are fixed.

3. The tank manufacturing method according to claim 2, wherein:
   a relative moving direction of the mandrel in the moving is a direction where the mandrel moves along the axial center direction from a side where the second guide portions are placed toward a side where the first guide portions are placed.

4. The tank manufacturing method according to claim 2, wherein:
   a thickness of the first fiber bundles supplied from the first guide portions is thinner than a thickness of the second fiber bundles supplied from the second guide portions.

5. The tank manufacturing method according to claim 1, wherein
   a swinging range of the first guide portions in the circumferential direction becomes larger as a diameter of the mandrel becomes larger.

6. A helical winding device that winds fiber bundles around a mandrel by helical winding, comprising:
   a first guide ring having an opening to pass the mandrel therethrough;
   a plurality of first guide portions placed in the first guide ring along a circumferential direction around an axial center of the mandrel and configured to supply first fiber bundles to the mandrel; and
   a swing mechanism having a controller programmed to swing the first guide portions in the circumferential direction while at the same time the first fiber bundles are continuously supplied to the mandrel.

7. The helical winding device according to claim 6, further comprising:
   a second guide ring having an opening to pass the mandrel therethrough and placed such that the second guide ring and the first guide ring are arranged side by side in an axial center direction along the axial center; and
   a plurality of second guide portions placed in the second guide ring along the circumferential direction and configured to supply second fiber bundles to the mandrel, wherein:
   the first guide portions and the second guide portions are placed alternately along the circumferential direction when viewed in the axial center direction; and
   circumferential positions of the second guide portions are fixed.

8. The helical winding device according to claim 7, wherein:
   a thickness of the first fiber bundles supplied from the first guide portions is thinner than a thickness of the second fiber bundles supplied from the second guide portions.

9. The helical winding device according to claim 6, wherein
   the swing mechanism increases a swinging range of the first guide portions in the circumferential direction as a diameter of the mandrel becomes larger.

10. A filament winding apparatus that winds fiber bundles around a mandrel, the filament winding apparatus comprising:
    the helical winding device according to claim 6.

* * * * *